United States Patent
Shoji et al.

(10) Patent No.: US 7,225,003 B2
(45) Date of Patent: May 29, 2007

(54) MOBILE TERMINAL INCLUDING FIRST AND SECOND HOUSINGS AND AN ANTENNA

(75) Inventors: Hideaki Shoji, Hyogo (JP); Takatoshi Katsura, Hyogo (JP); Yoshinori Matsunami, Hyogo (JP); Yasuhito Imanishi, Hyogo (JP); Tetsuya Tanaka, Hyogo (JP); Hirokazu Taketomi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/240,384

(22) Filed: Oct. 3, 2005

(65) Prior Publication Data

US 2006/0025185 A1 Feb. 2, 2006

Related U.S. Application Data

(63) Continuation of application No. 10/181,445, filed as application No. PCT/JP00/09373 on Dec. 28, 2000.

(51) Int. Cl.
*H04M 1/00* (2006.01)
*H01Q 11/12* (2006.01)

(52) U.S. Cl. .............. 455/575.5; 455/575.7; 455/117; 455/575.5

(58) Field of Classification Search .......... 455/575.3, 455/575.1, 575.5, 550.1, 575.7, 575.8, 90.3, 455/117; 379/433.01, 433.04, 428.01, 429
See application file for complete search history.

(56) References Cited

U.S. PATENT DOCUMENTS

| | | | |
|---|---|---|---|
| 5,530,919 A | 6/1996 | Tsuru et al. | |
| 5,649,306 A | 7/1997 | Vannatta et al. | |
| 5,657,386 A * | 8/1997 | Schwanke | 379/433.13 |
| 5,668,867 A | 9/1997 | Nagai | |
| 5,812,093 A | 9/1998 | Thompson et al. | |
| 5,819,162 A | 10/1998 | Spann et al. | |
| 5,945,954 A * | 8/1999 | Johnson | 343/702 |
| 6,075,977 A | 6/2000 | Bayrami | |
| 6,147,649 A * | 11/2000 | Ivrissimtzis et al. | 343/700 MS |
| 6,215,454 B1 | 4/2001 | Tran | |
| 6,249,688 B1 * | 6/2001 | Holshouser et al. | 455/575.7 |
| 6,285,327 B1 | 9/2001 | See | |
| 6,297,945 B1 | 10/2001 | Yamamoto | |
| 6,311,076 B1 * | 10/2001 | Peuhu et al. | 455/566 |

(Continued)

FOREIGN PATENT DOCUMENTS

EP 0 588 365 3/1994

(Continued)

*Primary Examiner*—Sonny Trinh
(74) *Attorney, Agent, or Firm*—Oblon, Spivak, McClelland, Maier & Neustadt, P.C.

(57) ABSTRACT

A mobile phone includes a lower housing having one and and the other end, an upper housing having one end pivotally connected to the lower housing, and an antenna accommodated close to one end of the lower housing. The other end of the upper housing pivots toward and away from the other end of the lower housing. The mobile phone is used in close proximity to a user's head with the other end of the upper housing being distanced from the other end of the lower housing. Upon use, the lower housing is disposed relative to the upper housing so that the upper housing intervenes between the antenna and the user's head.

4 Claims, 20 Drawing Sheets

U.S. PATENT DOCUMENTS

| | | |
|---|---|---|
| 6,600,450 B1 * | 7/2003 | Efanov et al. ............... 343/726 |
| 6,615,026 B1 * | 9/2003 | Wong ...................... 455/575.5 |
| 6,748,243 B1 | 6/2004 | Kubo et al. |
| 6,775,560 B2 | 8/2004 | King et al. |
| 6,795,719 B2 | 9/2004 | Miyashita et al. |
| 6,947,000 B2 * | 9/2005 | Ito ............................ 343/702 |
| 2004/0023682 A1 * | 2/2004 | Lee et al. ................. 455/550.1 |
| 2004/0063476 A1 * | 4/2004 | Katagishi et al. ........ 455/575.7 |
| 2004/0070542 A1 | 4/2004 | Takebe |
| 2004/0203526 A1 * | 10/2004 | Romeu et al. ............. 455/90.3 |
| 2005/0176475 A1 * | 8/2005 | Sawamura ............... 455/575.3 |

FOREIGN PATENT DOCUMENTS

| | | |
|---|---|---|
| EP | 1 009 104 | 6/2000 |
| JP | 06-0169217 | 6/1994 |
| JP | 7-38461 | 2/1995 |
| JP | 7-79110 | 3/1995 |
| JP | 07-203523 | 8/1995 |
| JP | 08-102609 | 4/1996 |
| JP | 09-130118 | 5/1997 |
| JP | 09-130288 | 5/1997 |
| JP | 10-224439 | 8/1998 |
| JP | 11-041330 | 2/1999 |
| JP | 11-177485 | 7/1999 |
| JP | 11-331017 | 11/1999 |
| JP | 11-346256 | 12/1999 |
| JP | 2000-114843 | 4/2000 |
| JP | 2000-124732 | 4/2000 |
| JP | 2000-197118 | 7/2000 |
| WO | WO 98/19434 | 5/1998 |
| WO | WO 99/43040 | 8/1999 |
| WO | WO 99/43041 | 8/1999 |

* cited by examiner

FIG.18
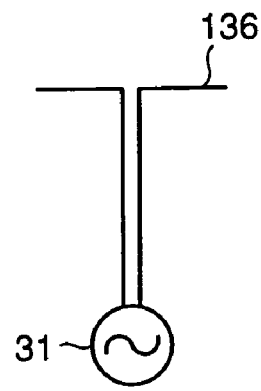
FIG.19
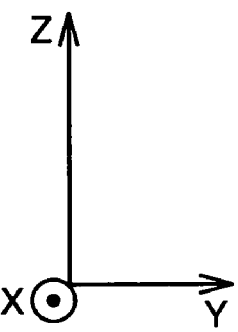
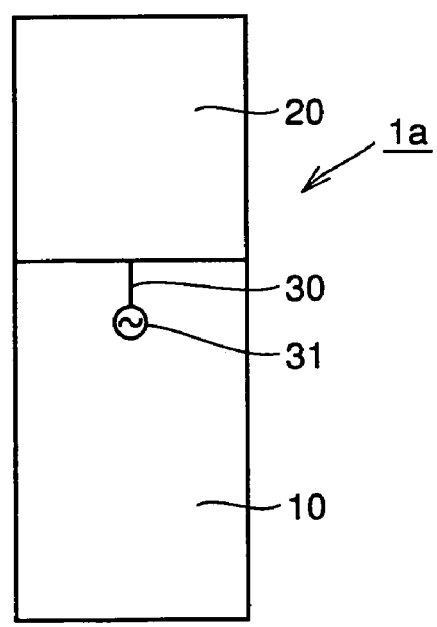

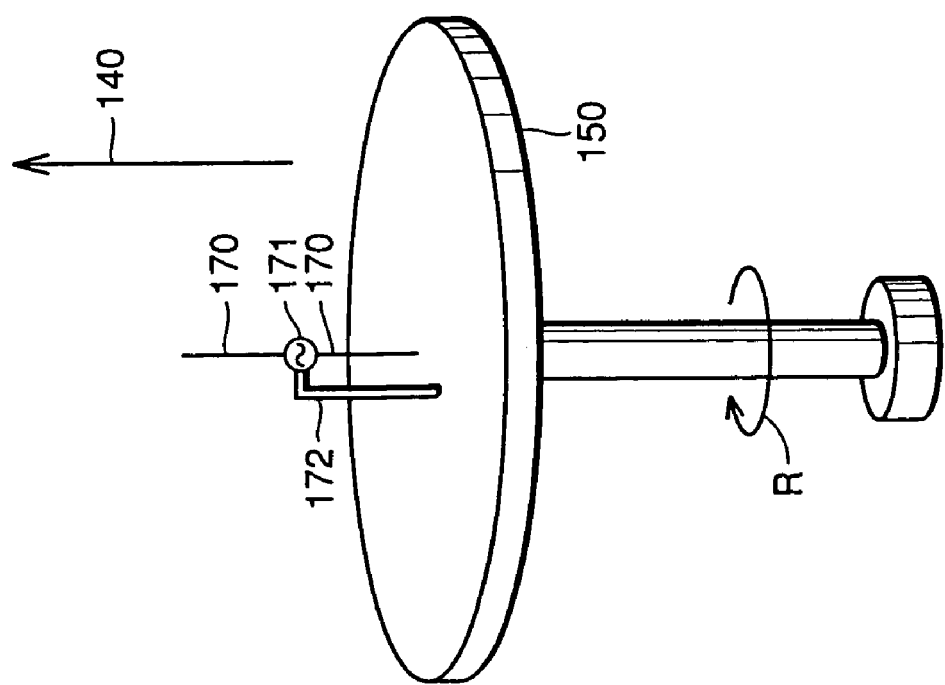
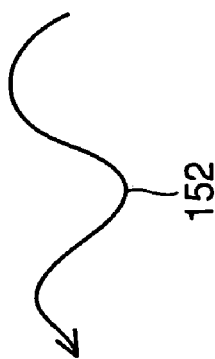
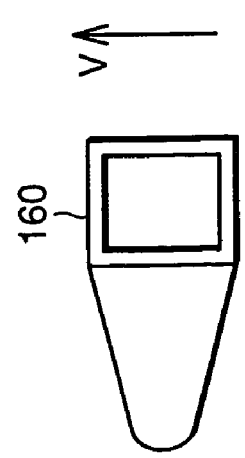
FIG.22

MOBILE TERMINAL INCLUDING FIRST AND SECOND HOUSINGS AND AN ANTENNA

CROSS-REFERENCE TO RELATED APPLICATION

The present application is a Continuation of U.S. application Ser. No. 10/181,445, filed on Jul. 26, 2002, now U.S. Pat. No. 7,031,762, which is a National Stage of PCT/JP00/09373 filed on Dec. 28, 2000, the entire contents of both of which are incorporated herein by reference.

TECHNICAL FIELD

The present invention relates to a mobile terminal, and more specifically, to a mobile terminal as represented by a mobile phone.

BACKGROUND ART

The use of mobile phones has been spreading rapidly these days. Under such circumstances, the development regarding prevention of transmission gain degradation is proceeding. FIG. 27 is a perspective view of a conventional mobile phone. Referring to FIG. 27, a housing 402 of a mobile wireless radio as a mobile phone is divided into a first unit 402a having a receiver unit, and a second unit 402b without a receiver unit. The second unit 402b is foldably connected to the lower portion of the first unit 402a by a folding unit 402c. An aerial 401 as an antenna is formed to project upwardly toward the first unit 402a from an upper end surface 423 of the second unit 402b of the housing 402 of the mobile radio.

In the above mentioned conventional mobile phone, however, the following problems are involved.

First, since the antenna is extending from the housing and exposed, it tends to contact with user's fingers. In such a case, a problem arises that the antenna gain degrades under the effect of fingers.

Further, though there is the first unit 402a between a user's head and the aerial 401, the action of the first unit 402a serving as a shielding plate for electromagnetic waves decreases due to the wide distance between the first unit 402a and the aerial 401. As a result, the aerial is affected by the user's head, and thus the antenna gain tends to be degraded.

In addition, when the mobile phone is placed on a conductive material such as a metal board, a problem arises that antenna gain of the aerial 401 is degraded under the effect of the metal board, which in turn degrades speech quality.

Therefore, an object of the present invention is to solve the problems described above, and to provide a mobile terminal that can alleviate degradation of antenna gain.

DISCLOSURE OF THE INVENTION

A mobile terminal according to the present invention includes a first housing having one end and the other end, a second housing having one end and the other end, with that one end being pivotally mounted to the first housing, and a first antenna element accommodated in one end of the first housing. The other end of the second housing pivots toward or away from the other end of the first housing. Upon use, the other end of the second housing is distanced from the other end of the first housing and held in close proximity to a user's head. Upon use, the first housing is disposed relative to the second housing so that the second housing intervenes between the first antenna element and the user's head.

In thus formed mobile terminal, the first antenna element is accommodated in the first housing. Thus the first antenna element will not be affected by the contact with fingers, and therefore degradation of the antenna gain is prevented. Further, even when the mobile terminal is placed on a metal board, the antenna gain will not degrade since the first housing intervenes between the first antenna element and the metal board. Additionally, since the second housing intervenes between the first antenna element and the user's head upon use, and the distance between the first antenna element and the second housing is shortened, the second housing shields the electromagnetic wave transmitted to/received by the first antenna element. Therefore, the antenna element will not be affected by the user's head and thus degradation of the antenna gain can be prevented.

Preferably, the first antenna element includes at least one type of antenna selected from the group consisting of a monopole antenna, a dipole antenna, a plate antenna, an inverted F type antenna, and a loop antenna.

Preferably, the first antenna element is accommodated between a portion of the first housing to which one end of the second housing is connected, and one end of the first housing.

Preferably, the first housing includes a first surface facing to the user's head and a second surface opposing to the first surface, and the first antenna element is accommodated close to the first surface. Thus, since the first antenna element is accommodated close to the position distanced from the second surface which is to contact with fingers, that the first antenna element is protected from the effect of the user. As a result, further stable antenna gain can be attained.

Preferably, a conductive plate with constant potential is accommodated close to the second surface. Thus, the first antenna element is less affected by fingers in contact with the second surface.

Preferably, the mobile terminal further includes a second antenna element at the other end of the second housing.

Preferably, the first housing includes either one of a liquid crystal display unit indicating text information or an operation unit to be pressed by fingers for operation. The second housing includes the other one of the liquid crystal display unit or the operation unit.

Preferably, the operation unit includes a substrate extending from one end to the other end within the first housing, and the first antenna element is provided on the substrate.

Preferably, the second housing is conductive. Thus, the second housing has an effect to shield electromagnetic wave, thus the antenna is less likely affected by the user's head, and degradation of antenna gain is prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a schematic view of antennas used in a mobile phone of the present invention.

FIG. 19 shows relation between a mobile phone and coordinate axes.

FIG. 22 shows a process of measuring a radiation pattern on x-z plane.

BEST MODES FOR CARRYING OUT THE INVENTION (First Embodiment)

Figure 1:
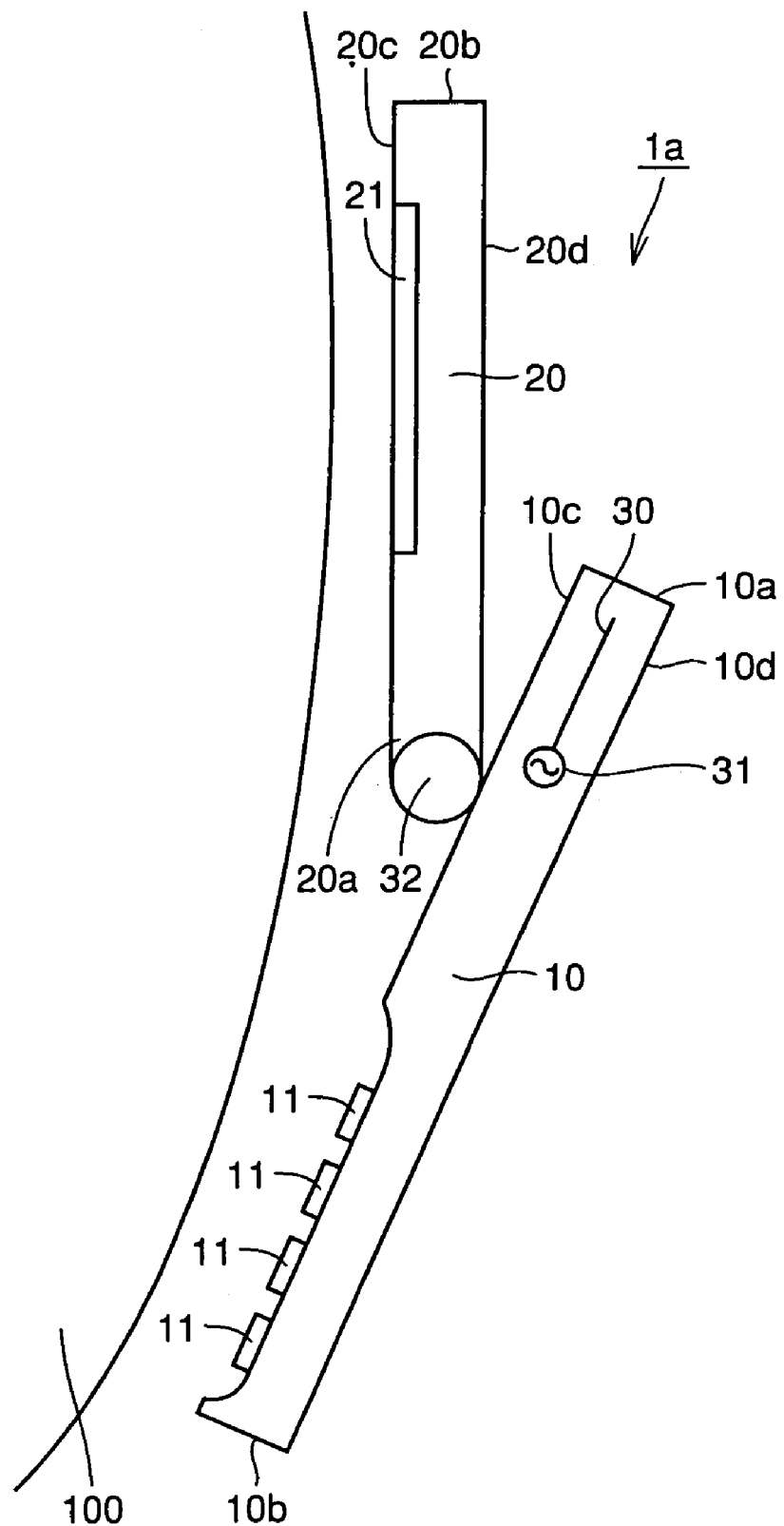
FIG. 1 is a schematic side view of a mobile phone according to a first embodiment of the present invention.

FIG. 1 is a side view of a mobile phone according to a first embodiment of the present invention. Referring to FIG. 1, the mobile phone 1a as a mobile terminal according to the present invention includes a lower housing 10 as a first housing having one end 10a and the other end 10b, an upper housing 20 as a second housing having one end 20a pivotally connected to the lower housing 10, and a monopole antenna 30 as a first antenna element accommodated close to one end 10a of the lower housing 10. The other end of the upper housing 20 pivots toward and away from the other end 10b of the lower housing 10. The mobile phone 1a is used in close proximity to a user's head with the other end 20b of the upper housing 20 being distanced from the other end 10b of the lower housing 10. Upon use, the lower housing 10 is disposed relative to the upper housing 20 so that the upper housing 20 intervenes between the monopole antenna 30 and the user's head 100.

The mobile phone 1a includes the lower housing 10 and the upper housing 20 connected to the lower housing 10. In the one end 10a of the lower housing 10, the monopole antenna 30 is accommodated. The monopole antenna 30 is accommodated between a portion of the lower housing 10 to which the upper housing 20 is connected and one end 10a of the lower housing 10. The lower housing 10 is made with plastics, and the monopole antenna 30 is accommodated within the space thereof. A feed point 31 is provided at one end of the monopole antenna 30. The lower housing 10 includes a first surface 10c facing to the user's head 100, and a second surface 10d opposing thereto. The monopole antenna 30 is provided at the middle point between the first surface 10c and the second surface 10d.

The first surface 10c is provided with an axis 32. A monopole antenna 30 is provided between the portion to which the axis 32 is mounted and the one end 10a. The other end 10b of the lower housing 10 is provided with a plurality of push buttons 11 as an operation unit to be pressed with fingers for operation. Manual pressing of the push buttons 11 allows input of information such as telephone numbers.

One end 20a of the upper housing 20 is pivotally connected to the lower housing 10 via the axis 32. The upper housing 20 extends from one end 20a to the other end 20b. As materials for structuring the upper housing 20, not only insulating material such as plastics, but also conductive materials with high performance of shielding electromagnetic waves such as magnesium can be employed. It is also possible to plate the surface of the plastics with highly conductive materials. The first surface 20c of the upper housing 20 is provided with a liquid crystal display device 21 as a liquid crystal display unit for displaying text information. Text information will appear on the liquid crystal display device to be viewed by the user. The second surface 20d of the upper housing 20 is disposed opposite to the first surface 20c and upon use as illustrated in FIG. 1 it will face to the lower housing 10. Both of the first surface 10c of the lower housing 10 and the first surface 20c of the upper housing 20 are in close proximity to the user's head 100.

Figure 2:
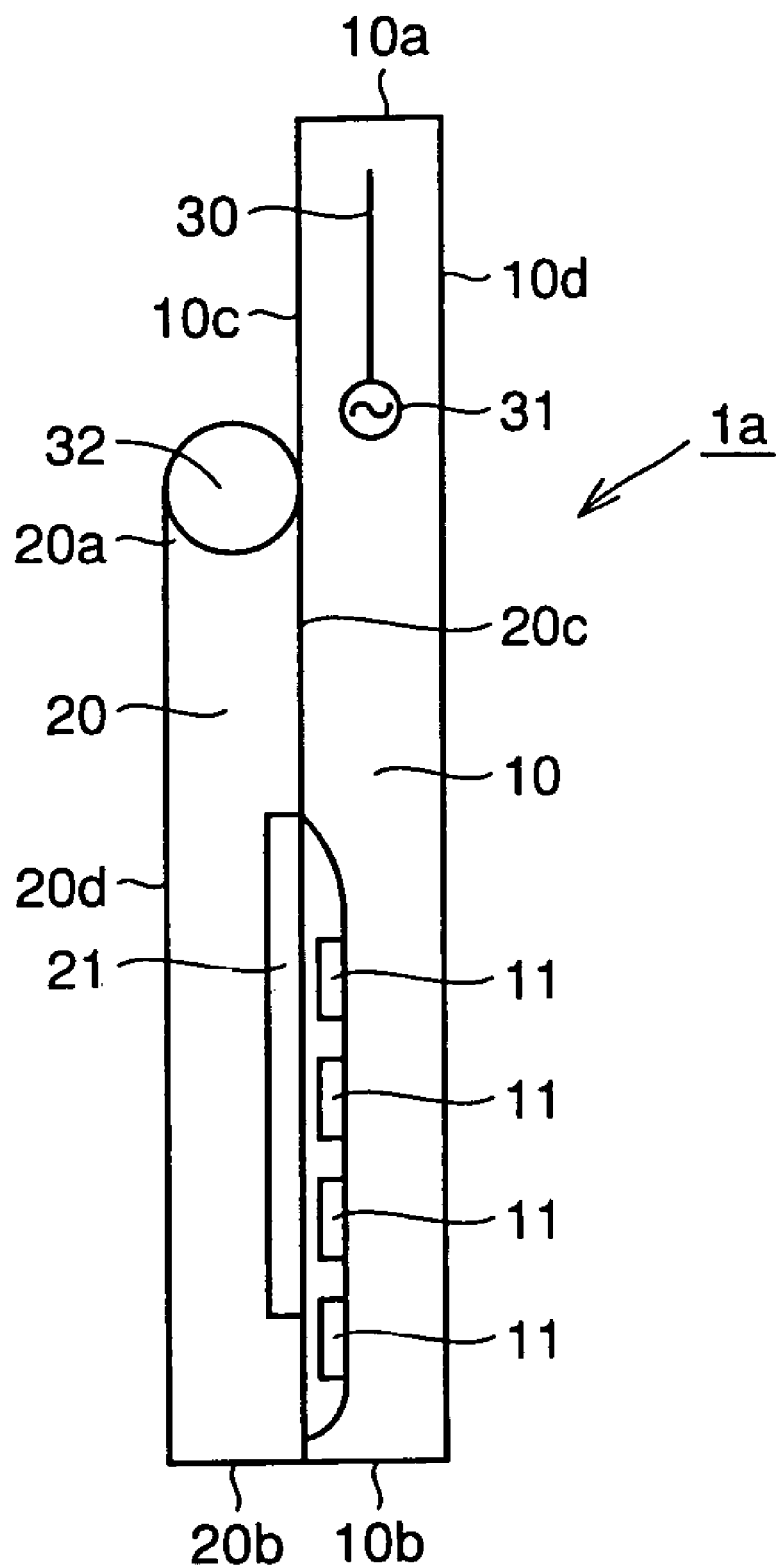
FIG. 2 shows the mobile phone illustrated in FIG. 1 in a compact form.

FIG. 2 illustrates the mobile phone of FIG. 1 in a compact form for easier accommodation. Referring to FIG. 2, when the mobile phone 1a is to be made compact, the upper housing 20 pivots toward the lower housing 20 so that the first surface 20c of the upper housing 20 and the first surface 10c of the lower housing 10 face to each other. Thus, by flipping the upper housing 20, the overall size of mobile phone can be made compact for easier accommodation.

In thus formed mobile phone 1a, the monopole antenna 30 is accommodated in the lower housing 10. Accordingly, since the monopole antenna 30 will not contact with fingers, the degradation of antenna gain can be prevented and stable antenna gain can be obtained.

Since the monopole antenna 30 is accommodated in the lower housing 10, even when the mobile phone 1a is dropped, the monopole antenna 30 will not be damaged and thus mechanical strength can also be attained.

Further, when the mobile phone 1a is placed on a metal board, since the second surface 10d of the lower housing 10 intervenes between the monopole antenna 30 and the metal board, the antenna characteristics can be prevented from degradation and becomes stable. As a result, speech quality will not be degraded.

Additionally, since the distance between the monopole antenna 30 and the upper housing 20 is short, the upper housing 20 will shield electromagnetic waves. As a result, the monopole antenna 30 can be protected from the effect of the user's head 100. Thus, degradation of the antenna gain can be prevented.

(Second Embodiment)

Figure 3:
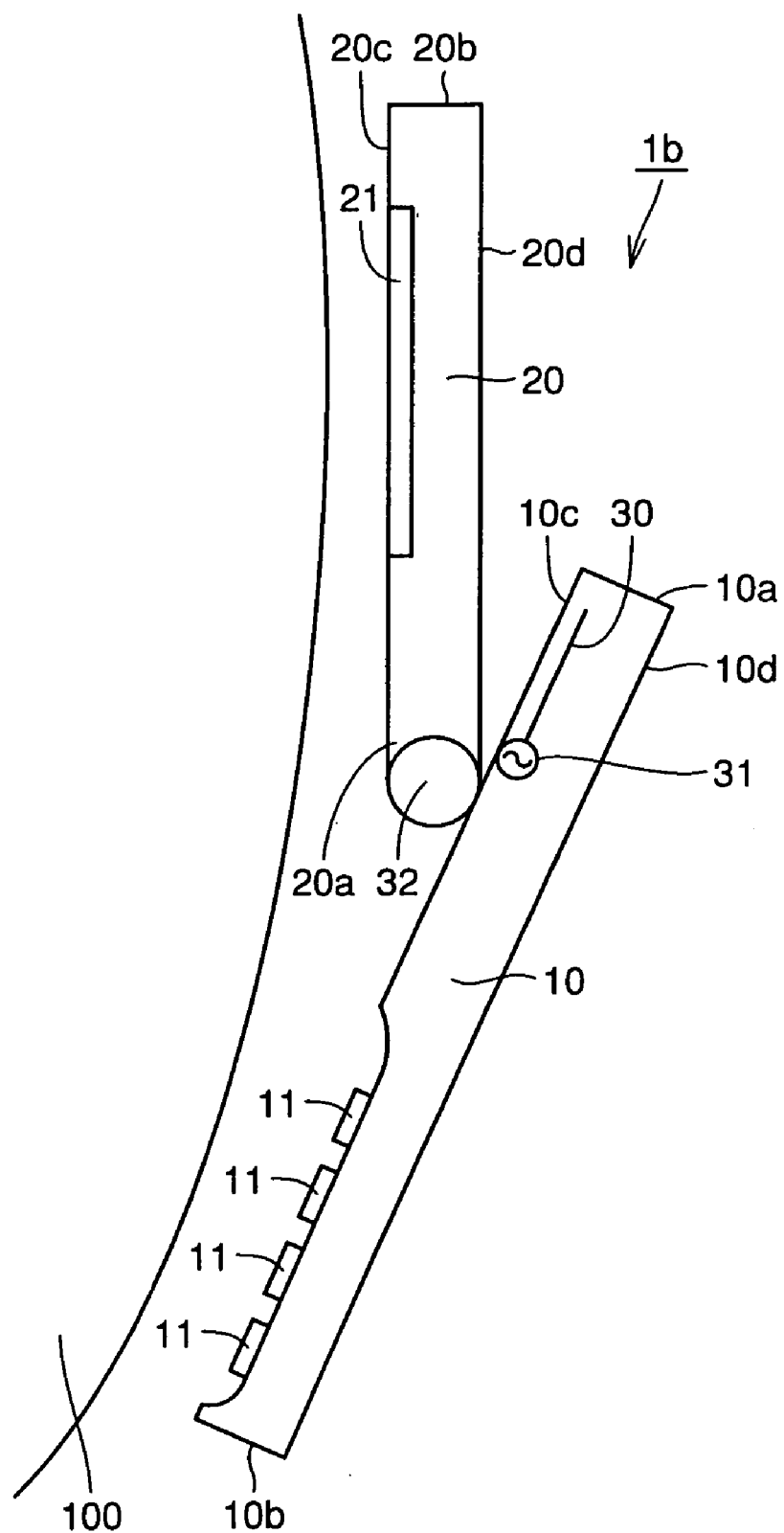
FIG. 3 is a schematic side view of a mobile phone according to a second embodiment of the present invention.

FIG. 3 is a schematic side view of a mobile phone according to a second embodiment of the present invention. Referring to FIG. 3, the mobile phone 1b according to the second embodiment of the present invention is different from the mobile phone 1a according to the first embodiment in that monopole antenna 30 is provided near the first surface 10c in the lower housing 10.

Thus structured mobile phone 1b primarily has the same effect as the mobile phone 1a according to the first embodiment. Further, since the monopole antenna 30 is disposed remotely from the second surface 10d of the lower housing 10 to which fingers may contact, degradation of antenna gain can further be alleviated. Additionally, with a thin type of lower housing 10, degradation of antenna gain due to the effect of fingers can be prevented as well.

(Third Embodiment)

Figure 4:
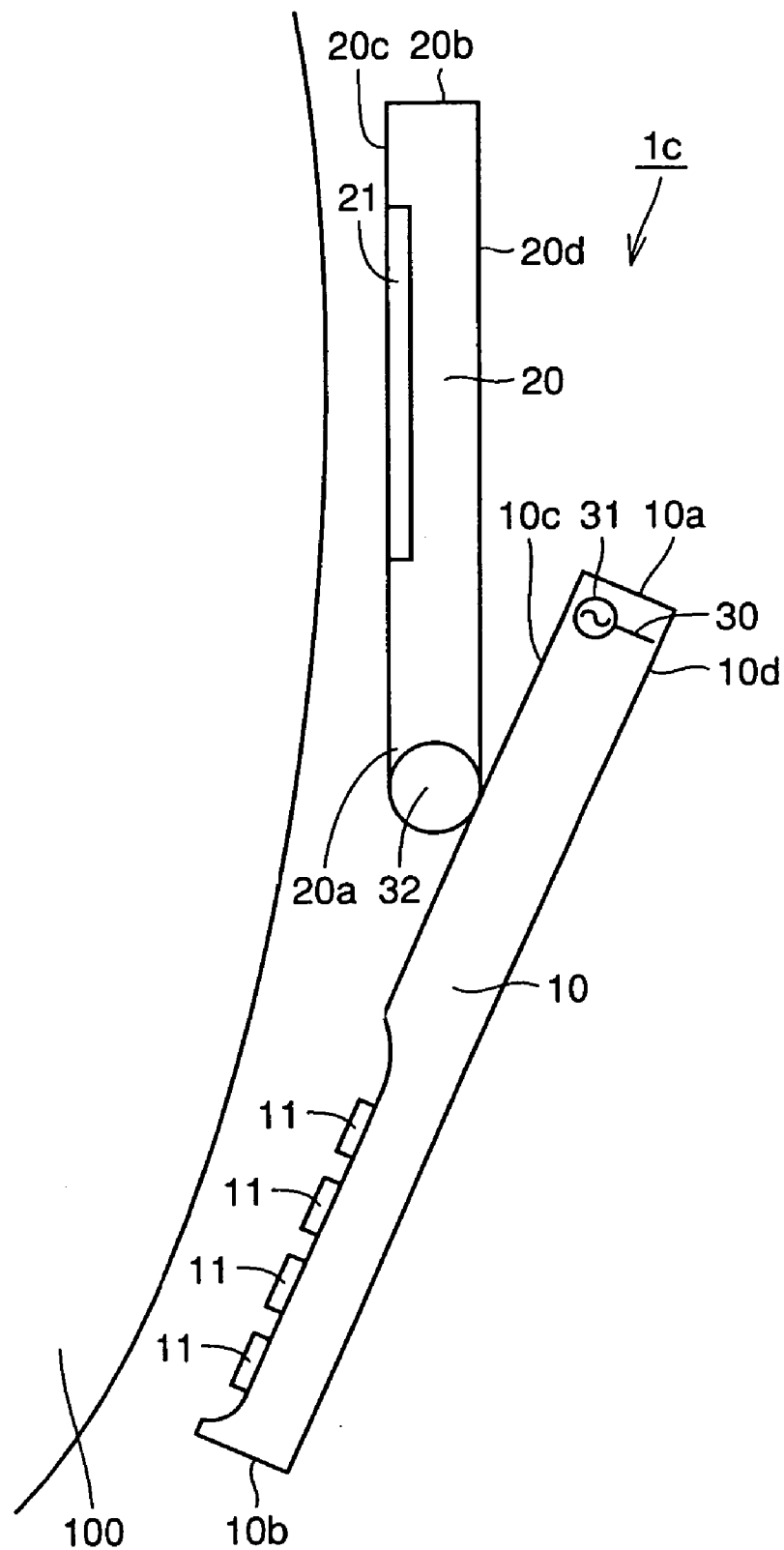
FIG. 4 is a schematic side view of a mobile phone according to a third embodiment of the present invention.

FIG. 4 is a schematic side view of a mobile phone according to a third embodiment of the present invention. Referring to FIG. 4, the mobile phone 1c according to the third embodiment of the present invention is different from the mobile phone 1a according to the first embodiment in that monopole antenna 30 is provided at one end 10a of the lower housing 10, i.e., at the top surface. The monopole antenna 30 extends approximately orthogonal to the direction to which the lower housing 10 extends.

Thus structured mobile phone 1c also has the same effect as the mobile phone 1a according to the first embodiment. Further, since the monopole antenna 30 is attached at the top surface of the lower housing 10, the attachment area of the antenna can be made smaller.

(Fourth Embodiment)

Figure 5:
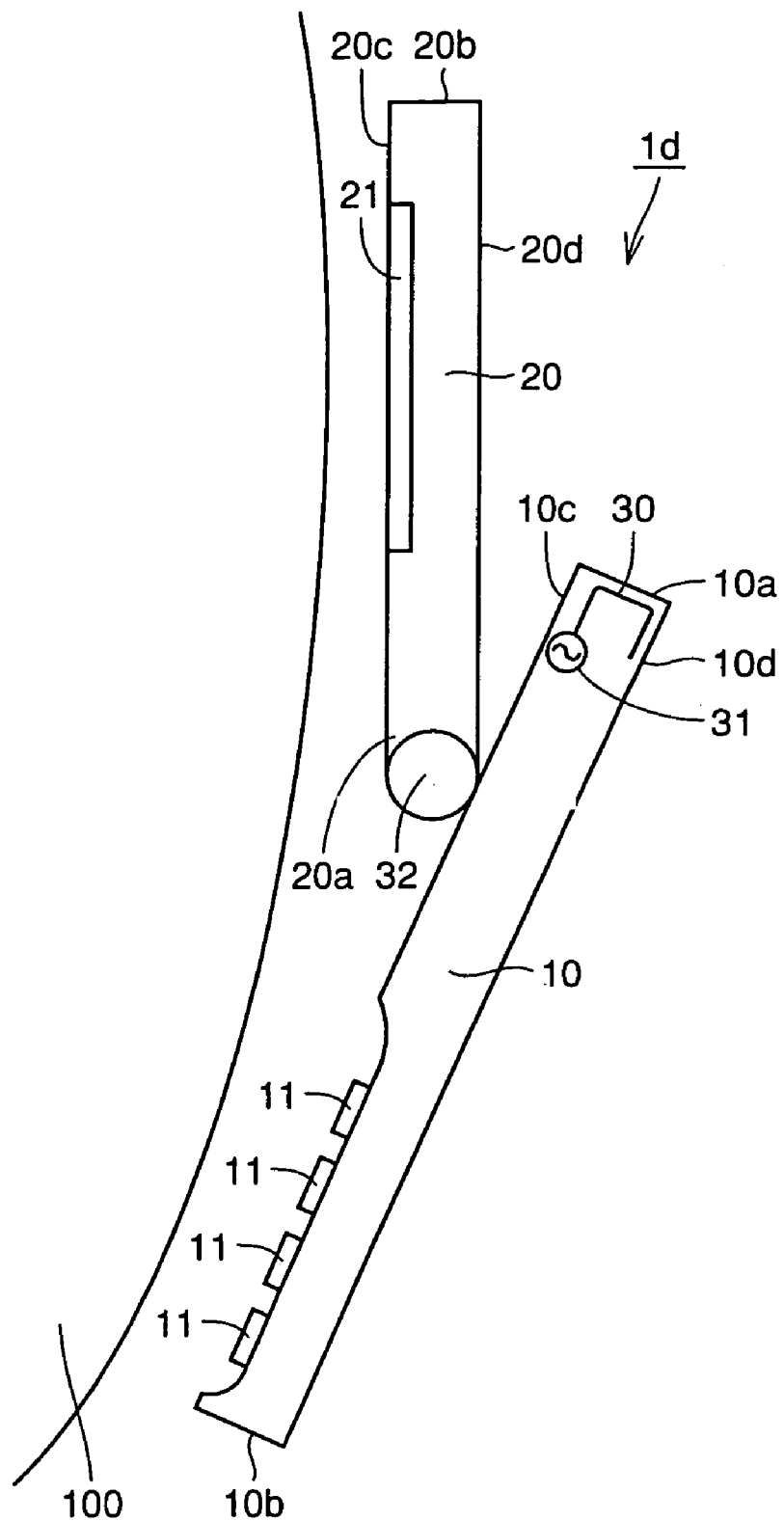
FIG. 5 is a schematic side view of a mobile phone according to a fourth embodiment of the present invention.

FIG. 5 is a schematic side view of a mobile phone according to a fourth embodiment of the present invention. Referring to FIG. 5, a mobile phone 1d according to the fourth embodiment of the present invention is different from the mobile phone 1a according to the first embodiment in that the provided monopole antenna 30 is bent. Such monopole antenna 30 is in the composite form of antennas described in the first to third embodiments.

Thus structured mobile phone 1d also has the same effect as the mobile phone 1a according to the first embodiment.

(Fifth Embodiment)

Figure 6:
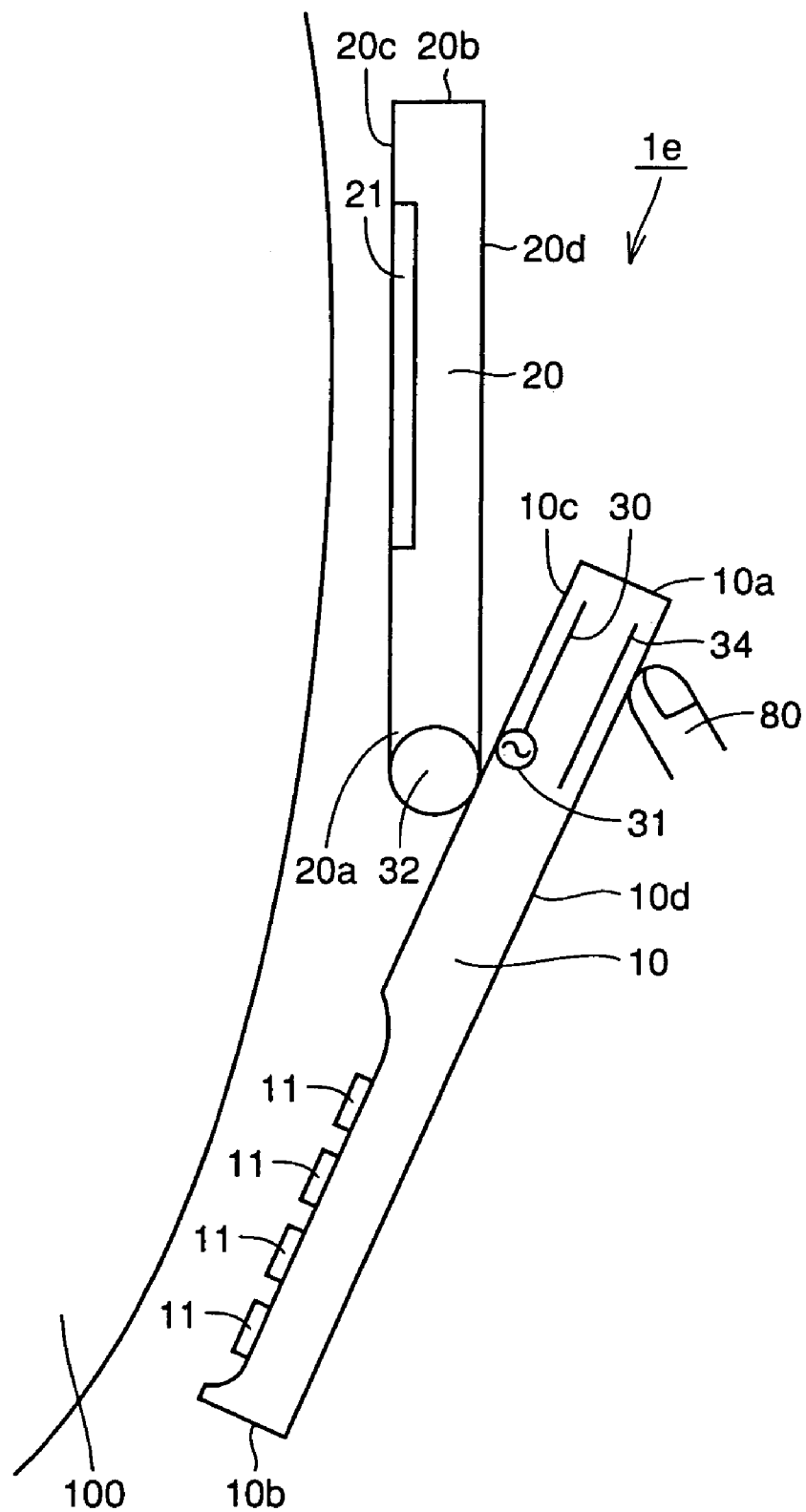
FIG. 6 is a schematic side view of a mobile phone according to a fifth embodiment of the present invention.

FIG. 6 is the schematic side view of a mobile phone according to a fifth embodiment of the present invention. Referring to FIG. 6, the mobile phone 1e according to the fifth embodiment of the present invention is different from the mobile phone 1a according to the first embodiment in that a metal plate 34 as a ground with constant potential is provided between the monopole antenna 30 and the second surface 10d. The metal plate 34 prevents the monopole antenna 30 from affected by user's finger 80.

Thus structured mobile phone 1d also has the same effect as the mobile phone 1a according to the first embodiment. Further, by placing the metal plate 34 to be the ground in the portion possibly contacted by fingers, the effect upon contact can further be reduced.

(Sixth Embodiment)

Figure 7:
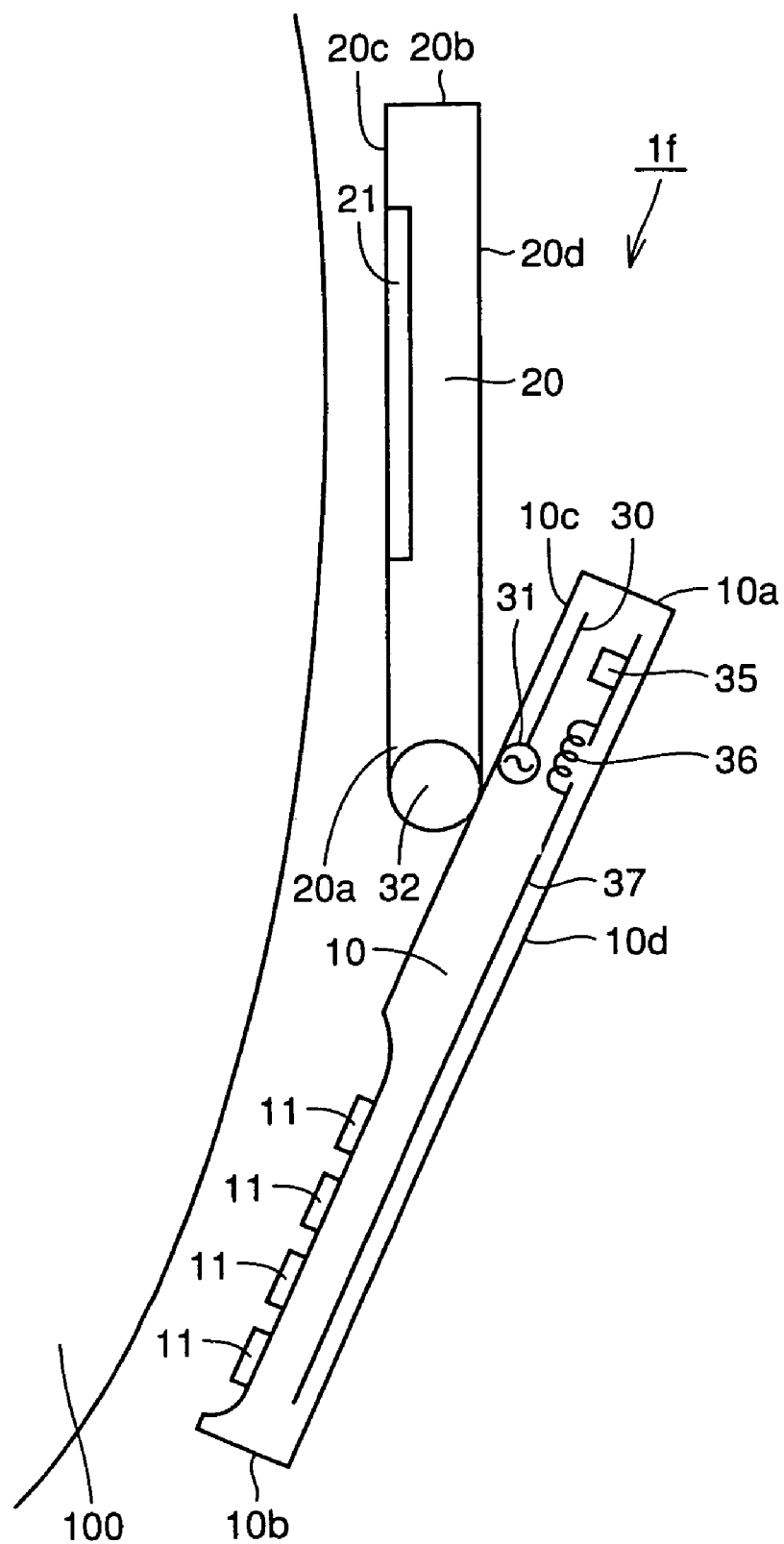
FIG. 7 is a schematic side view of a mobile phone according to a sixth embodiment of the present invention.

FIG. 7 is the schematic side view of a mobile phone according to a sixth embodiment of the present invention. Referring to FIG. 7, the mobile phone 1f according to the sixth embodiment of the present invention is different from the mobile phone 1a according to the first embodiment in that a vibrator 35 is provided near the monopole antenna 30, which is connected to a substrate 37 via a coil 36. The vibrator 35 can be replaced with other components. The coil 36 is provided between the vibrator 35 and the substrate 37, thus vibrator is less likely affected by high frequency waves which is input to/output from the monopole antenna 30.

Thus structured mobile phone 1f also has the same effect as the mobile phone 1a according to the first embodiment. Further, by attaching components such as the vibrator near the antenna, the mobile phone 1f can be made compact. Additionally, the vibrator can be enclosed by a material with high conductivity to oscillate as an antenna element itself.

(Seventh Embodiment)

Figure 8:
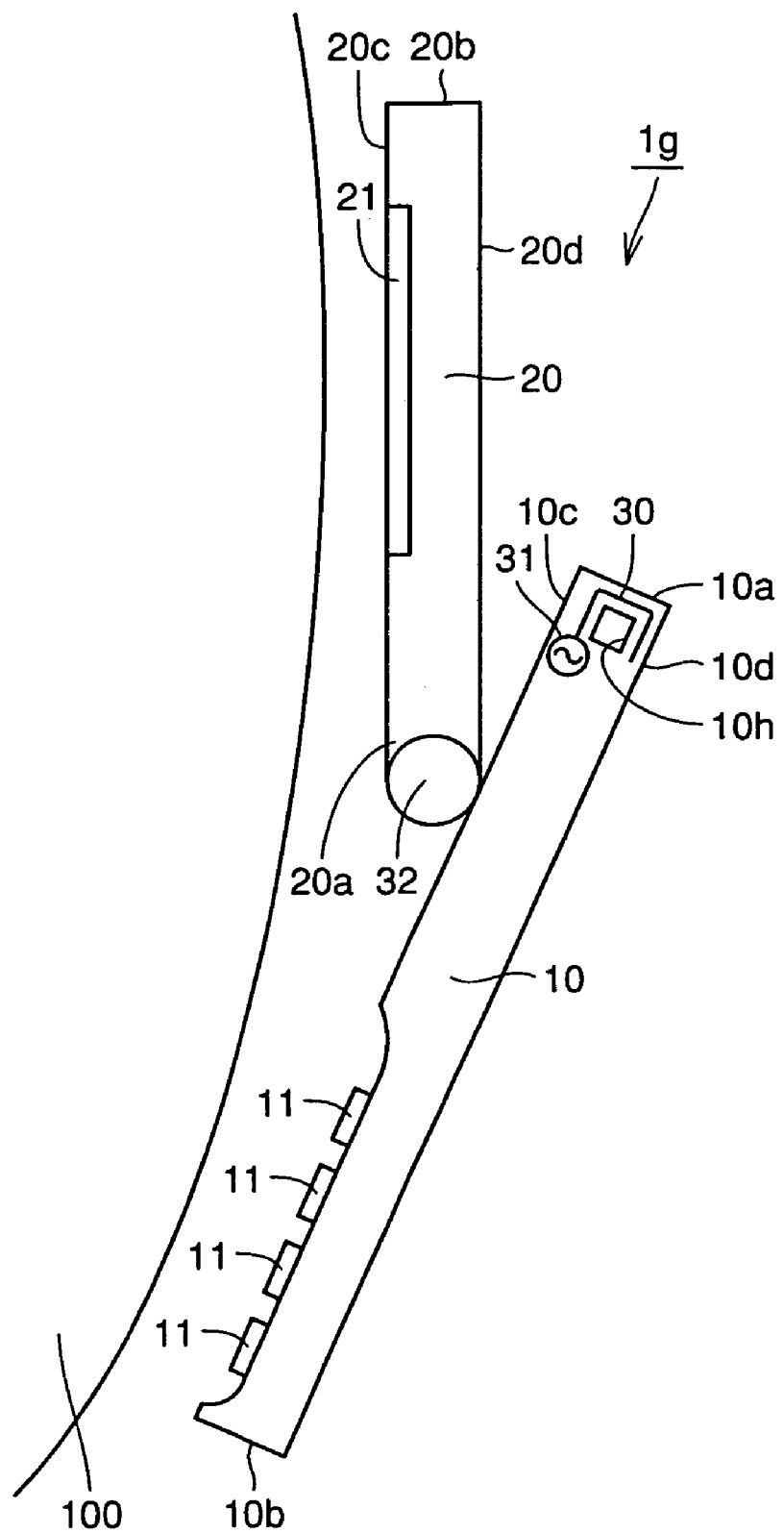
FIG. 8 is a schematic side view of a mobile phone according to a seventh embodiment of the present invention.

FIG. 8 is the schematic side view of a mobile phone according to a seventh embodiment of the present invention. Referring to FIG. 8, the mobile phone 1g according to the seventh embodiment of the present invention is different from the mobile phone 1a according to the first embodiment in that a hole 10h for a strap is provided in the lower housing 10, with the monopole antenna 30 being provided around it. The hole is shown prismatic, but it may be formed as cylindrical as well.

Thus structured mobile phone 1g also has the same effect as the mobile phone 1a according to the first embodiment.

(Eighth Embodiment)

Figure 9:
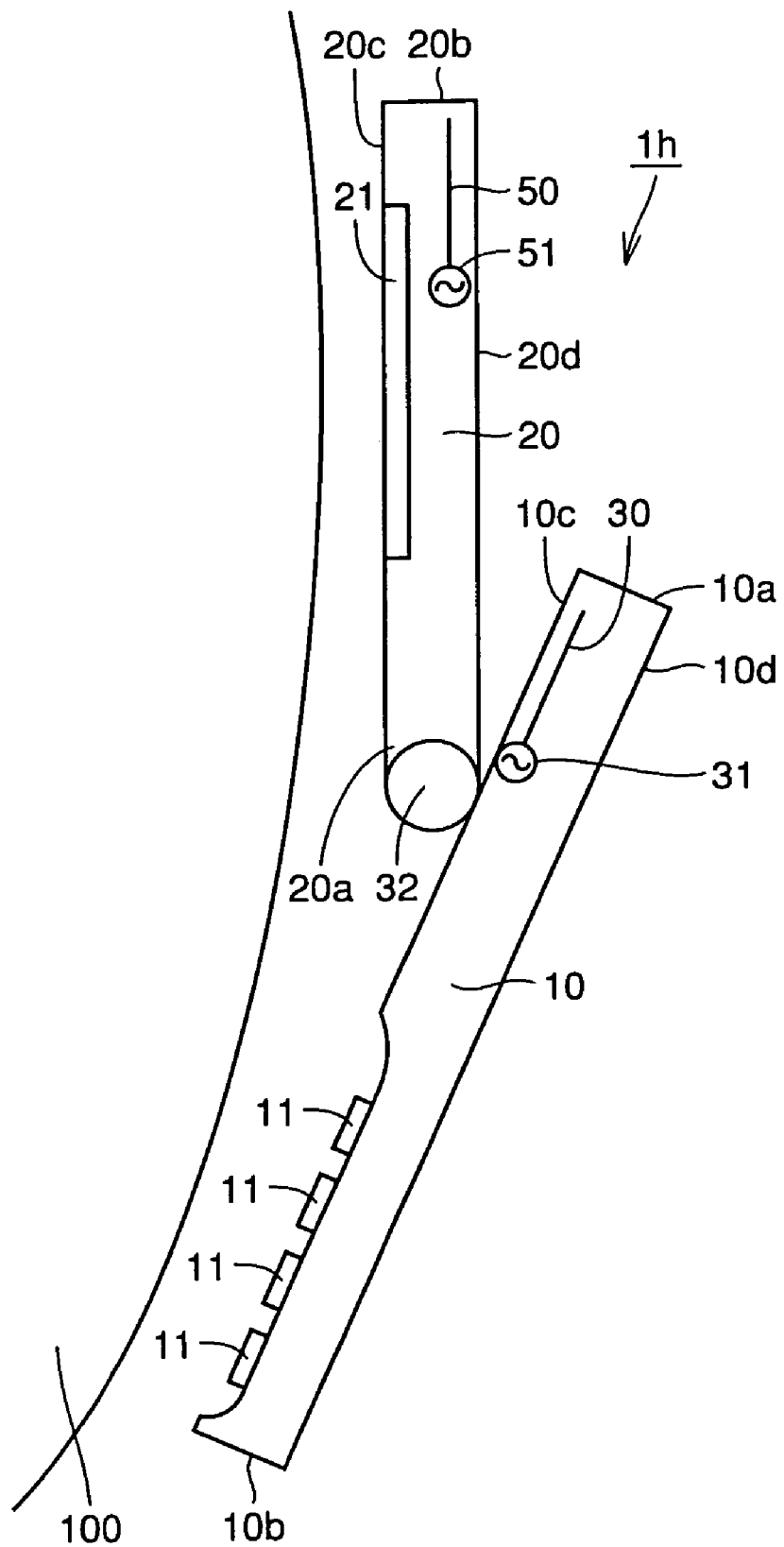
FIG. 9 is a schematic side view of a mobile phone according to an eighth embodiment of the present invention.

FIG. 9 is the schematic side view of a mobile phone according to a eighth embodiment of the present invention. Referring to FIG. 9, the mobile phone 1h according to the present invention is different from the mobile phone 1a according to the first embodiment in that a monopole antenna 50 is also provided at the other end 20b of the upper housing 20. The monopole antenna 50 is connected to the feed point 51. The monopole antenna 50 is not necessarily be accommodated in the upper housing 20, and it may be projected from the upper housing 20. Further, the monopole antenna 50 can be provided at either side of the first surface 20c or the second surface 20d of the upper housing 20.

Thus structured mobile phone 1h also has the same effect as the mobile phone 1a according to the first embodiment. Further, whether the mobile phone 1h is in use or in the folded form, the distance between the monopole antenna 30 and the monopole antenna 50 are long; in other words, these antennas are kept separated in either case. As a result, degradation of the antenna effect can be prevented, alleviating troubles upon transmission. Further, the monopole antenna 50 may be a monopole antenna 30 at the same frequency band (e.g., a diversity antenna). Additionally, it may be an antenna for other systems (Bluetooth or Global Positioning System, GPS).

(Ninth Embodiment)

Figure 10:
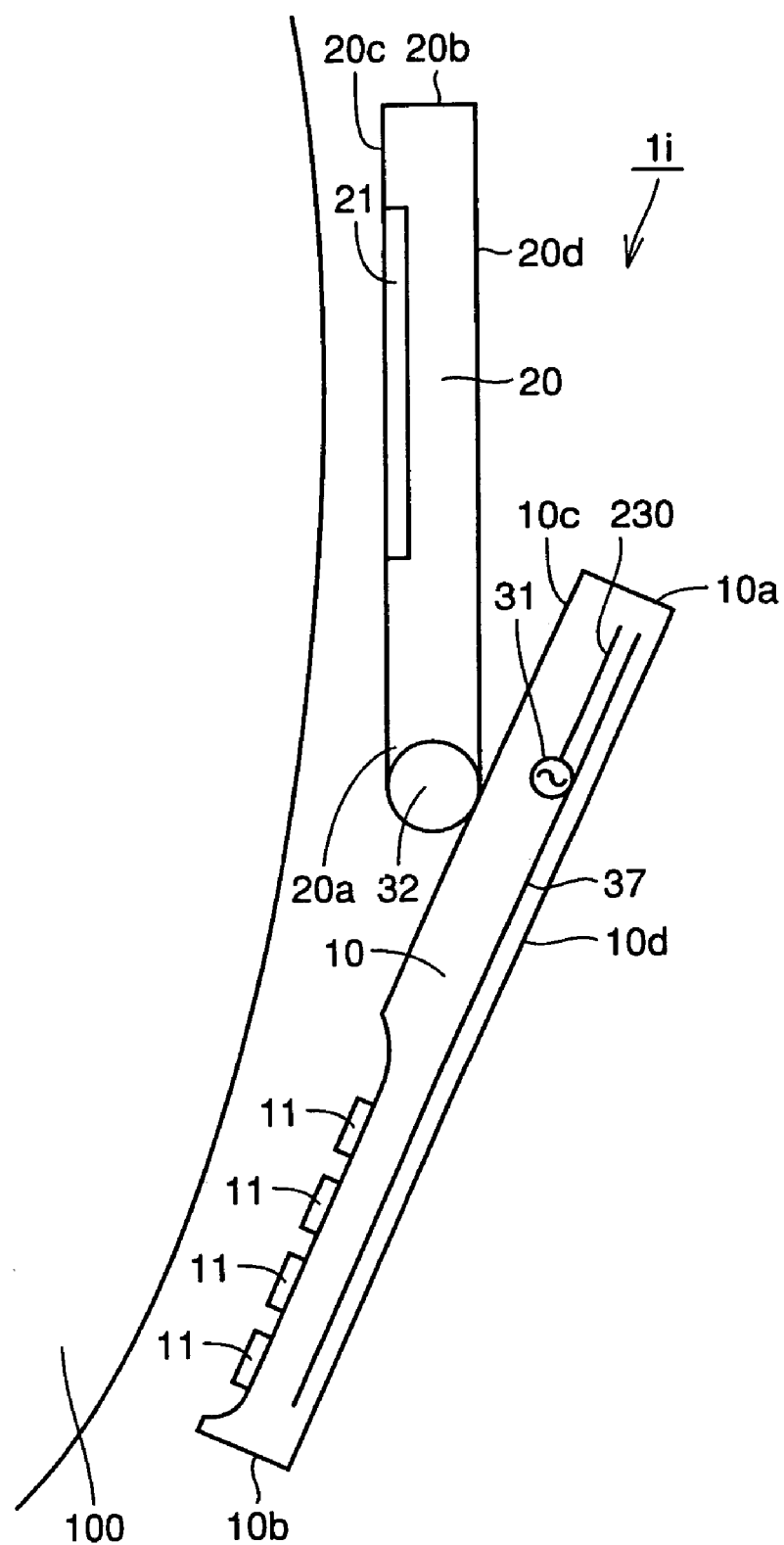
FIG. 10 is a schematic side view of a mobile phone according to a ninth embodiment of the present invention.

FIG. 10 is the schematic side view of a mobile phone according to a ninth embodiment of the present invention. Referring to FIG. 10, the mobile phone 1i according to the ninth embodiment of the present invention is different from the mobile phone 1a according to the first embodiment in that an operation unit includes an extended substrate 37, and a feed point 31 and a strip antenna 230 are formed thereon.

Thus structured mobile phone 1h also has the same effect as the mobile phone 1a according to the first embodiment. Further, by extending the substrate of the operation unit and forming the antenna thereon, the cost reduction can be contemplated.

(Tenth Embodiment)

Figure 11:
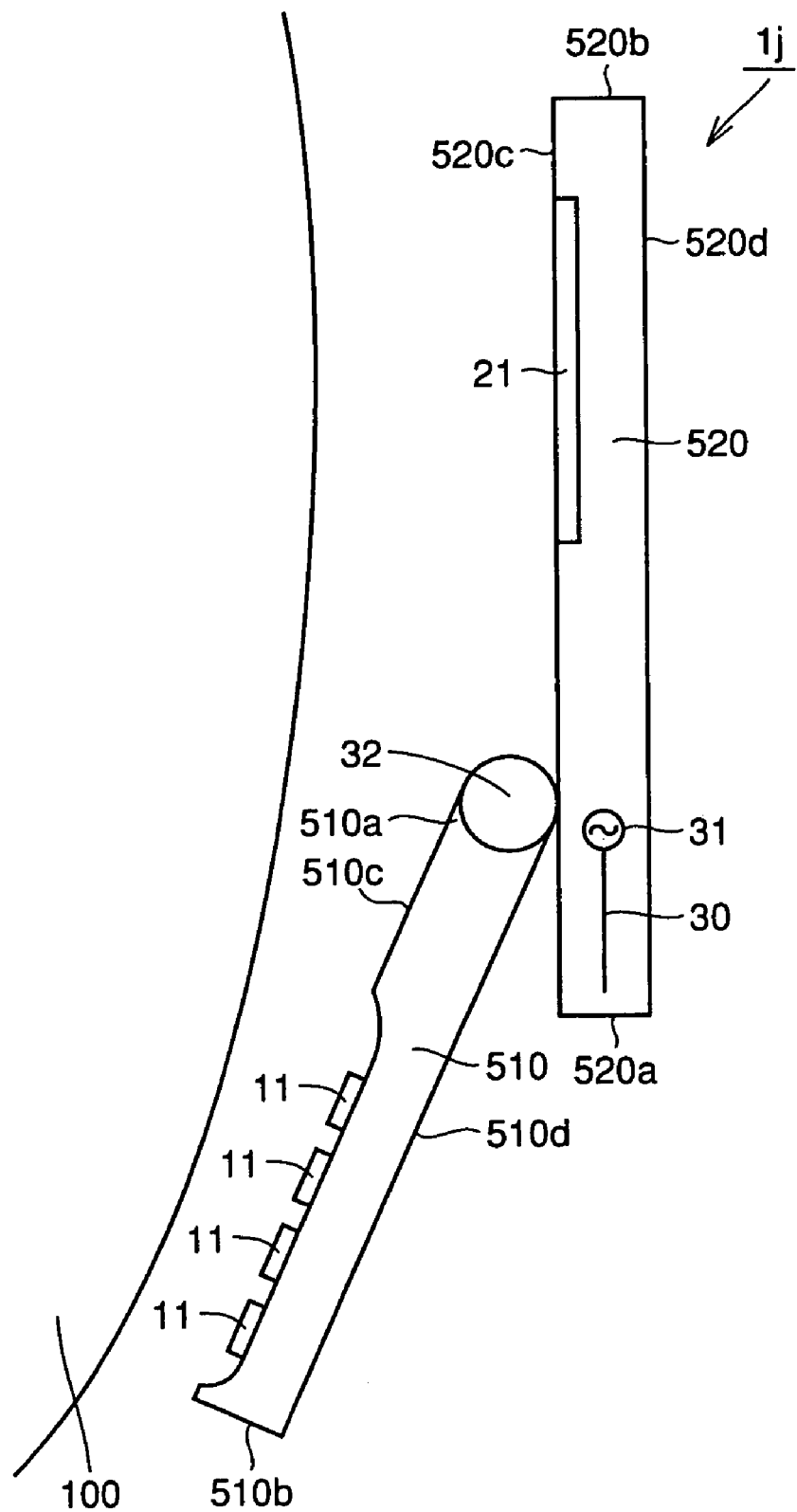
FIG. 11 is a schematic side view of a mobile phone according to a tenth embodiment of the present invention.

FIG. 11 is the schematic side view of a mobile phone according to a tenth embodiment of the present invention. Referring to FIG. 11, the mobile phone 1j according to the tenth embodiment of the present invention is different from the mobile phone 1a according to the first embodiment in that the monopole antenna 30 is accommodated close to one end 520a of an upper housing 520. In particular, the mobile phone 1j as a mobile terminal according to the present invention includes an upper housing 520 as a first housing having one end 520a and the other end 520b, a lower housing 510 as a second housing having one end 510a pivotally mounted to the upper housing 520, and a monopole antenna 30 as a first antenna element accommodated close to the one end 520a of the upper housing 520. The other end 510b of the lower housing 510 pivots toward and away from the other end 520b of the upper housing 520. The mobile phone 1j is used with the other end 510b of the lower housing 510 being distanced from the other end 520b of the upper housing 520 and in close proximity to the user's head 100. Upon use, the lower housing 510 is disposed relative to the upper housing 520 so that the lower housing 510 intervenes between the monopole antenna 30 and the user's head 100. The upper housing 520 has a first surface 520c and a second surface 520d, while the lower housing 510 has a first surface 510c and a second surface 510d.

Thus structured mobile phone 1j also has the same effect as the mobile phone 1a according to the first embodiment.

(Eleventh Embodiment)

Figure 12:
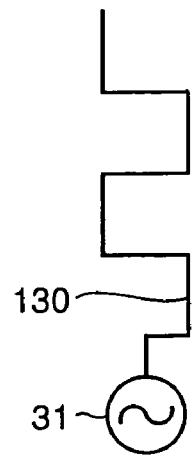
FIG. 12 is a schematic view of antennas used in a mobile phone of the present invention.

FIGS. 12 to 18 illustrate antennas used in the mobile phones according to the present invention. Referring to FIG. 12, in the mobile phone according to the present invention, a meanderline antenna 130 as a monopole antenna may be used in place of monopole antenna 30 shown in FIGS. 1 to 11.

Figure 13:
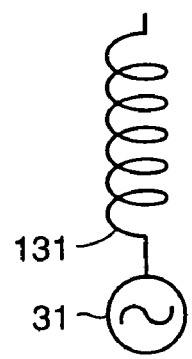
FIG. 13 is a schematic view of antennas used in a mobile phone of the present invention.

Referring to FIG. 13, in the mobile phone according to the present invention, a helical antenna 131 as a monopole antenna may be used in place of monopole antenna 30 shown in FIGS. 1 to 11.

Figure 14:
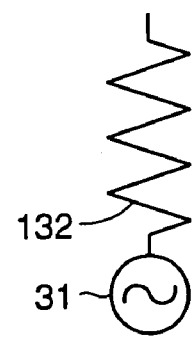
FIG. 14 is a schematic view of antennas used in a mobile phone of the present invention.

Referring to FIG. 14, in the mobile phone according to the present invention, a zigzag antenna 132 as a monopole antenna may be used in place of monopole antenna 30 shown in FIGS. 1 to 11.

Figure 15:
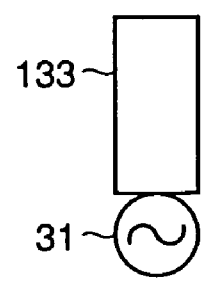
FIG. 15 is a schematic view of antennas used in a mobile phone of the present invention.

Referring to FIG. 15, in the mobile phone according to the present invention, a plate antenna 133 such as a patch antenna or a short patch antenna may be used in place of monopole antenna 30 shown in FIGS. 1 to 11.

Figure 16:
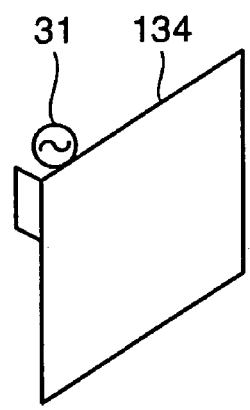
FIG. 16 is a schematic view of antennas used in a mobile phone of the present invention.

Referring to FIG. 16, in the mobile phone according to the present invention, an inverted F type antenna 134 may be used in place of monopole antenna 30 shown in FIGS. 1 to 11.

Figure 17:
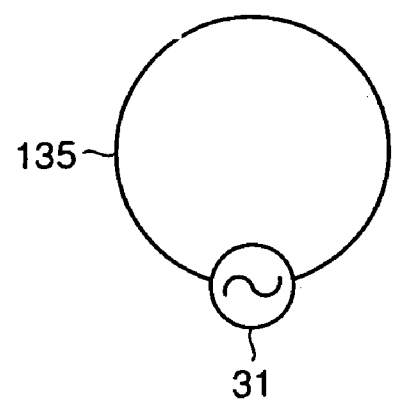
FIG. 17 is a schematic view of antennas used in a mobile phone of the present invention.

Referring to FIG. 17, in the mobile phone according to the present invention, a loop antenna 135 may be used in place of monopole antenna 30 shown in FIGS. 1 to 11.

Referring to FIG. 18, in the mobile phone according to the present invention, a dipole antenna 136 may be used in place of monopole antenna 30 shown in FIGS. 1 to 11.

Figure 20:
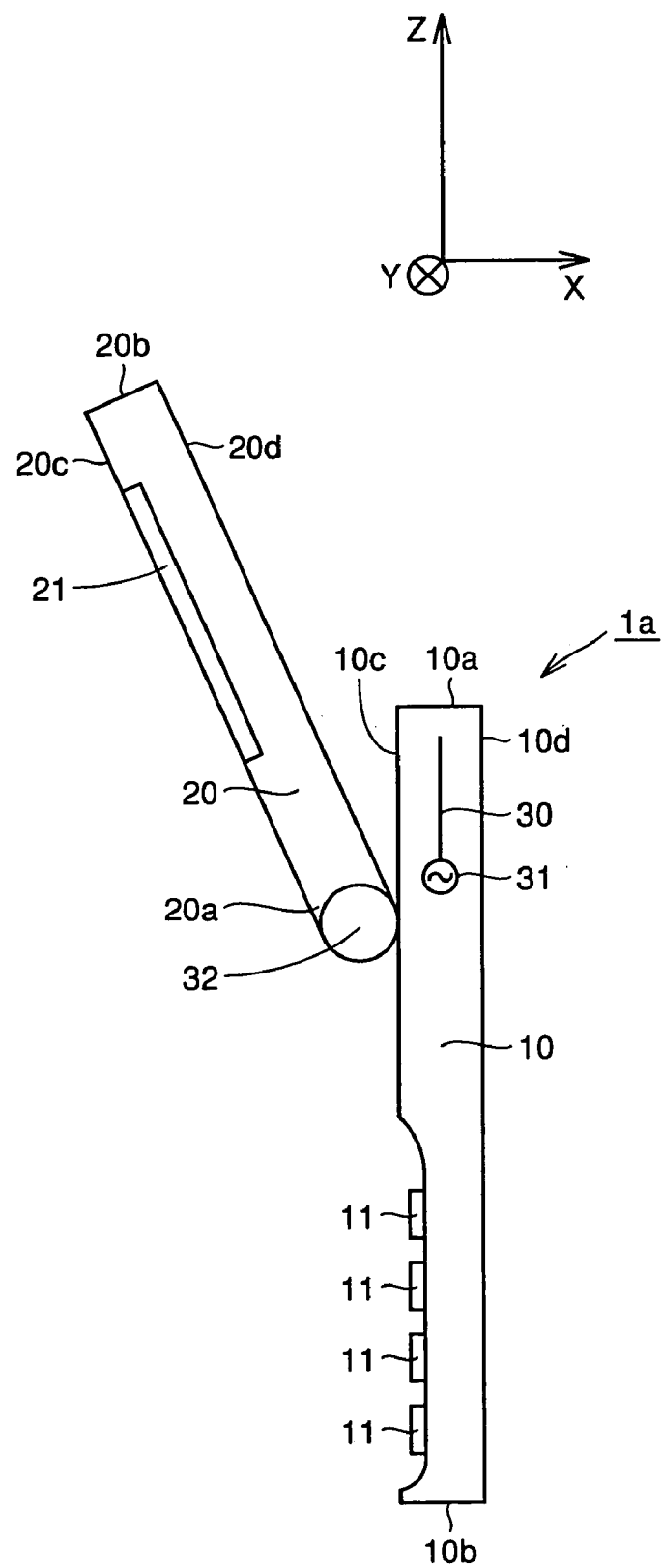
FIG. 20 shows relation between a mobile phone and coordinate axes.

Next, radiation characteristics of the mobile phone according to the present invention and a conventional mobile phone were compared. FIGS. 19 and 20 show relation between the mobile phone and coordinate axes. Note that FIG. 19 is a rear view of the mobile phone, while FIG. 20 is a side view thereof. First, a mobile phone 1a according to the present invention was prepared as shown in FIGS. 19 and 20. The mobile phone 1a includes a lower housing 10 and an upper housing 20. At one end 10a of the lower housing 10, a monopole antenna 30 in accommodated.

The direction to which the monopole antenna 30 extends is +Z direction. Further, from left to right direction in FIG. 19 is +Y direction. The direction from depth toward the plane of FIG. 19 is +X direction.

Figure 21:
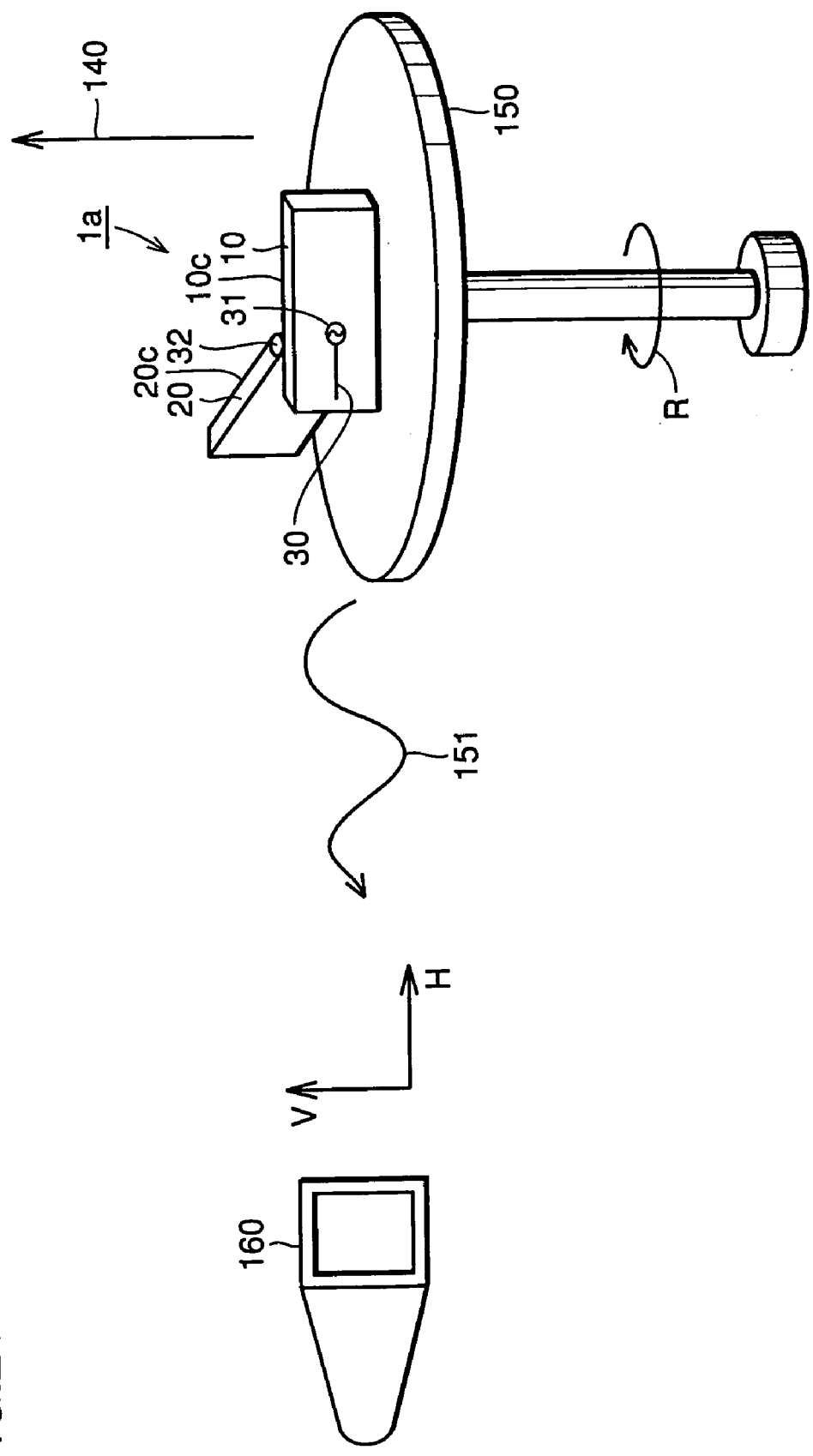
FIG. 21 shows a process of measuring a radiation pattern on x-z plane.
Figure 23:
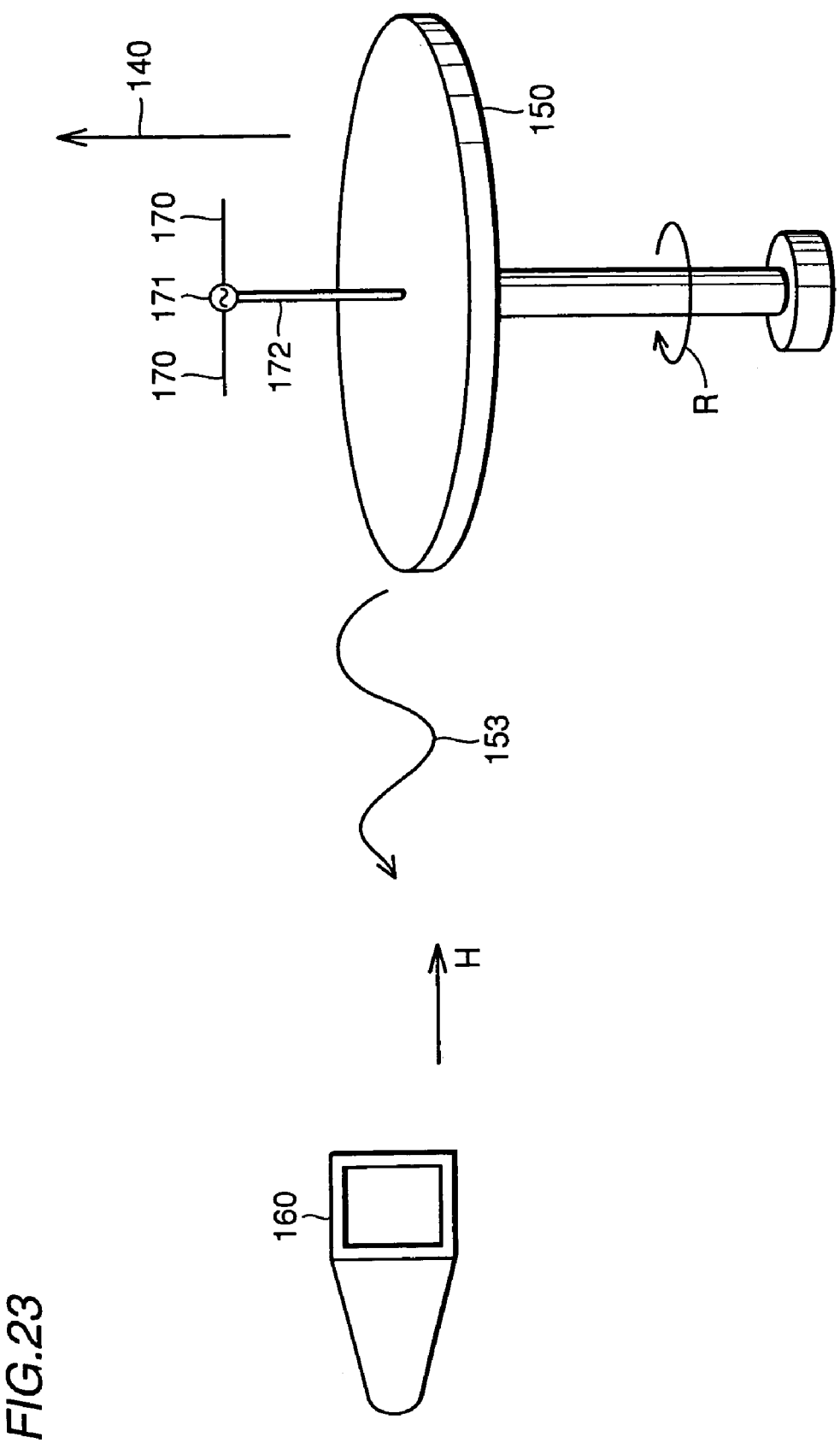
FIG. 23 shows a process of measuring a radiation pattern on x-z plane.

FIGS. 21 to 23 illustrate a process of measuring a radiation pattern in the X-Z plane. First, referring to FIG. 21, the mobile phone 1a shown in FIGS. 19 and 20 was placed on a table 150. Here, the placement was done such that the +Z direction and +X direction are orthogonal to the vertical direction indicated by an arrow 140. Thus, +Y direction is approximately parallel to the perpendicular direction represented by the arrow 140. The table 150 can be rotated in the direction indicated by an arrow R. A user was present near the first plane 10c and 20c.

In such a state in which the mobile phone 1a was placed on the table 150, radio wave at the frequency of 940 MHz was radiated from a radio transceiver unit via the monopole antenna 30 at a prescribed power. At the same time, the table was rotated in the direction indicated by the arrow R. Thus, a radio wave as indicated by the arrow 151 was radiated. The field intensity of the radio wave was measured by a measuring antenna 160, and the field intensity of vertically polarized wave in the direction indicated by an arrow V and horizontally polarized wave in the direction indicated by an arrow H was determined.

Referring to FIG. 22, a dipole antenna 170 was placed on the table 150. A feed point 171 was provided at the middle portion of the dipole antenna 170 and connected to a coaxial cable 172. The coaxial cable 172 was connected to the prescribed radio transceiver unit. The dipole antenna 170 extends approximately parallel to the perpendicular direction indicated by the arrow 140. By turning the table 150 in the direction indicated by the arrow R, and applying similar power to the dipole antenna 170 as applied to the mobile phone 1a by the radio transceiver unit illustrated in FIG. 21, radio wave as indicated by an arrow was radiated from the dipole antenna 170 at the frequency of 940 MHz. Thus, the radio wave indicated by the arrow 152 was radiated from the dipole antenna 170. The radio wave is a vertically polarized wave in the direction indicated by an arrow V. The field intensity of the radio wave was measured by a measuring antenna 160.

Referring to FIG. 23, the dipole antenna 170 was placed on the table 150. The dipole antenna was placed so that it extends orthogonal to the vertical direction indicated by the arrow 140. The feed point 171 was provided at the middle portion of the dipole antenna 170 and connected to the coaxial cable 172. By turning the table 150 in the direction indicated by the arrow R, and applying similar power to the dipole antenna 170 as applied to the mobile phone 1a by the radio transceiver unit illustrated in FIG. 21, radio wave as indicated by an arrow 153 was radiated from the dipole antenna 170 at the frequency of 940 MHz. The radio wave was a horizontally polarized wave in the direction indicated by an arrow H. The field intensity of the radio wave was measured by the measuring antenna 160.

Based on the data acquired in the process described with reference to FIGS. 21 to 23, an antenna element radiation pattern was determined. The result is shown in FIG. 24.

Figure 24:
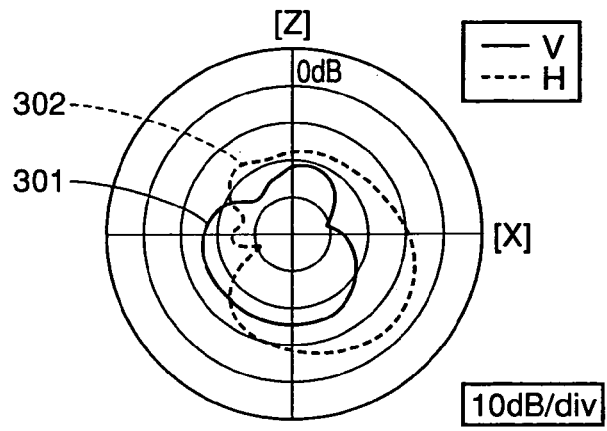
FIG. 24 is a graph showing antenna gain with a mobile phone according to the present invention.

In FIG. 24, solid line 301 indicates gain of vertically polarized wave of radio wave radiated by the monopole antenna 30 shown in FIG. 21 for the field intensity of the vertically polarized wave radiated by the dipole antenna 170 in the process shown in FIG. 22. The gain was determined by the following equation:

(gain)=20×log 10 (field intensity of the vertically polarized wave from the monopole antenna 30/field intensity of the vertically polarized wave from the dipole antenna 170)

Dotted line 302 indicates gain of horizontally polarized wave of radio wave radiated by the monopole antenna 30 shown in FIG. 21 for the field intensity of the horizontally polarized wave radiated by the dipole antenna 170 in the process shown in FIG. 23. The gain was determined by the following equation:

(gain)=20×log 10 (field intensity of the horizontally polarized wave from the monopole antenna 30/field intensity of the horizontally polarized wave from the dipole antenna 170)

Figure 25:
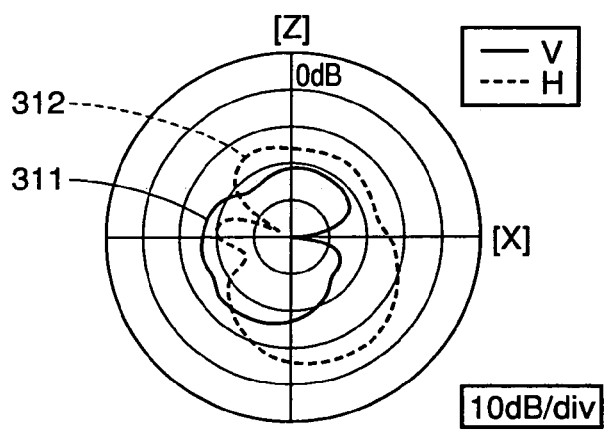
FIG. 25 is a graph showing antenna gain with an index finger placed on an antenna element.
Figure 26:
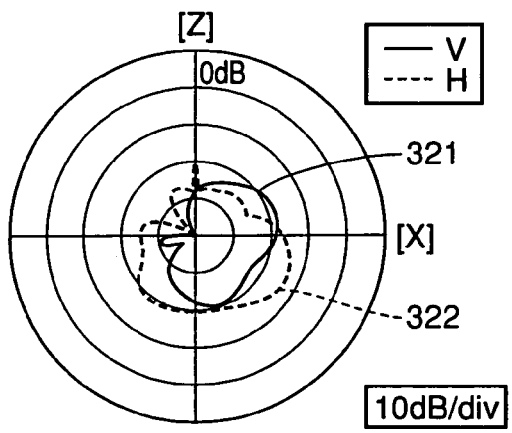
FIG. 26 is a graph showing antenna gain with a conventional mobile phone.

Meanwhile, one scale shown in FIGS. 24 to 26 indicates 10 dB. The mean gain of both vertically and horizontally polarized waves (cross polarization ratio, XPR=6 dB) was determined to be −14.73 dBd. Additionally, the peak value of the gain was −4.27 dBd.

Next, in the process shown in FIG. 21, the lower housing 10 was in contact with a user's hand at the portion distanced from the monopole antenna 30 by 2 mm. The body of the user was near the first surfaces 10c and 20c. Under such a condition, the table 150 shown in FIG. 21 was rotated in the direction of the arrow R and a prescribed power from the radio transceiver unit was applied to the monopole antenna 30 to radiate radio wave. Under such a condition, the table was rotated in the direction of the arrow R and similar power as described with reference to FIG. 21 was applied to the mobile phone 1a from the radio transceiver unit, then radio wave at the frequency of 940 MHz was radiated. The field intensity of vertically and horizontally polarized waves of the radio wave were measured by the measuring antenna 160.

FIG. 25 shows a radiation pattern with a user's hand in contact with the lower housing 10 placed near the monopole antenna 30. In FIG. 25, solid line 311 indicates gain of field intensity of vertically polarized wave of radio wave radiated by the mobile phone 1a with a user's hand in contact with the lower housing 10 near the monopole antenna 30 for the field intensity of the vertically polarized wave measured in the process shown in FIG. 22. The gain was determined by the following equation:

(gain)=20×log 10 (field intensity of the vertically polarized wave from the mobile phone 1a with a user's hand in contact with the lower housing 10 near the monopole antenna 30/field intensity of the vertically polarized wave from the dipole antenna 170)

Dotted line 312 indicates gain of field intensity of horizontally polarized wave of radio wave radiated by the mobile phone 1a with a user's hand in contact with the lower housing 10 near the monopole antenna 30 for the field intensity of the horizontally polarized wave measured in the process shown in FIG. 23. The gain was determined by the following equation:

(gain)=20×log 10 (field intensity of the horizontally polarized wave from the mobile phone 1a with a user's hand in contact with the lower housing 10 near the monopole antenna 30/field intensity of the horizontally polarized wave from the dipole antenna 170)

From FIG. 25, mean gain of vertically and horizontally polarized waves (XPR=6 dB) was determined to be a preferable value of −15.33 dBd. Peak value of the gain was −4.55 dBd.

Accordingly, it can be appreciated that high transmission gain is acquired in the present invention.

Figure 27:
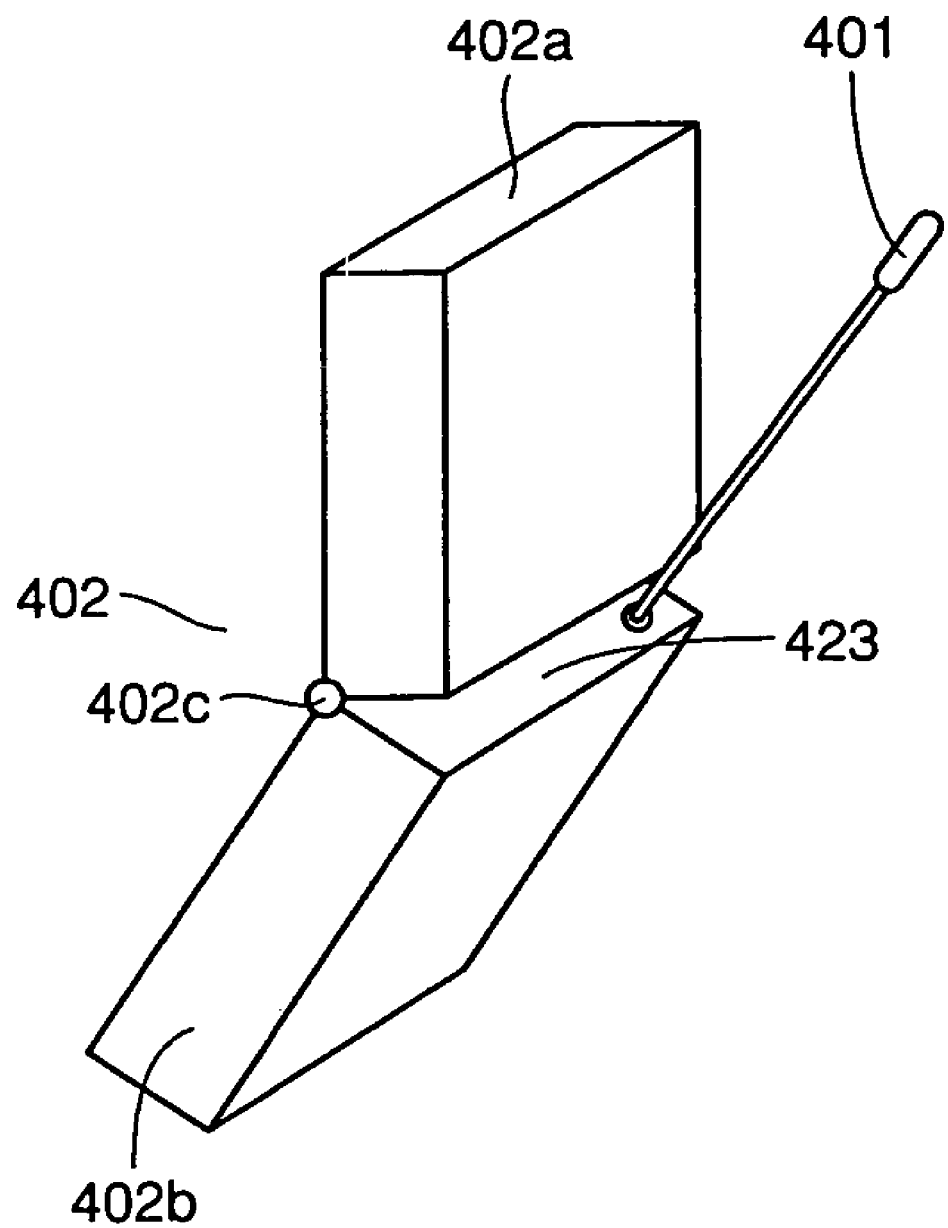
FIG. 27 is a perspective view showing a conventional mobile phone.

Next, with the conventional mobile wireless radio shown in FIG. 27, according to the same process as described with reference to FIG. 21, axis Z and axis X are horizontally directed, while axis Y is placed on the table 150 so as to be parallel to the vertical direction. A person was present opposite to the aerial 401 of the mobile transceiver. Under such a condition, the table was rotated in the direction indicated by the arrow R, while radio wave at the frequency of 940 MHz was radiated via the aerial 401. Simultaneously, similar power as applied to the monopole antenna 30 by the radio transceiver unit was applied to the aerial 401. Vertically and horizontally polarized waves of thus radiated radio waves were measured by the measuring antenna 160. FIG. 26 shows a radiation pattern for such a conventional antenna. In FIG. 26, solid line 321 indicates gain of field intensity of vertically polarized wave of radio wave radiated by the aerial 401 according to the step described with reference to FIG. 21 for the field intensity of the vertically polarized wave measured in the process shown in FIG. 22. The gain was determined by the following equation:

(gain)=20×log 10 (field intensity of the vertically polarized wave from the aerial 401/field intensity of the vertically polarized wave from the dipole antenna 170)

Dotted line 322 indicates gain of horizontally polarized wave of radio wave radiated by the aerial 401 according to the step described with reference to FIG. 21 for the field intensity of the horizontally polarized wave measured in the process shown in FIG. 23. The gain was determined by the following equation:

(gain)=20×log 10 (field intensity of the horizontally polarized wave from the aerial 401/field intensity of the horizontally polarized wave from the dipole antenna 170)

According to FIG. 26, it can be appreciated that gain of vertically and horizontally polarized waves are both decreased. From FIG. 26, the mean gain was determined to be −21.35 dBd. Additionally, peak value of gain was −13.41 dBd.

INDUSTRIAL APPLICABILITY

The mobile terminal according to the present invention can be utilized in the field of mobile phone.

The invention claimed is:

1. A mobile terminal, comprising:
a first housing having a front surface including an operation surface provided with an operation unit, and a back surface opposite the front surface;
a second housing pivotally mounted on said operation surface; and
an antenna entirely enclosed in a first portion of said first housing and positioned on an inner surface of said first portion of said first housing adjacent said front surface of said first housing,
wherein the first portion is a portion of said first housing that does not overlap said second housing when said first housing and said second housing are pivotally closed and facing each other, and the first portion is a portion that faces said second housing which is interposed between said antenna and a user facing surface of said second housing when said first housing and said second housing are pivotally opened.

2. The mobile terminal according to claim 1, further comprising: a conductive plate provided in said first portion, said conductive plate facing said antenna and being positioned between said antenna and said back surface of said first housing.

3. The mobile terminal according to claim 1, wherein said antenna includes at least one antenna selected from the group consisting of a monopole antenna, a dipole antenna, a plate antenna, an inverted F type antenna, and a loop antenna.

4. The mobile terminal according to claim 1, further comprising:
a second antenna provided at a first end portion of said second housing opposite to a second end portion of said second housing at which said second housing is pivotally mounted to said first housing.

* * * * *